(No Model.)

J. H. PATTERSON.
INTRENCHING TOOL.

No. 297,840. Patented Apr. 29, 1884.

Witnesses:

Inventor

UNITED STATES PATENT OFFICE.

JOHN H. PATTERSON, OF THE UNITED STATES ARMY.

INTRENCHING-TOOL.

SPECIFICATION forming part of Letters Patent No. 297,840, dated April 29, 1884.

Application filed June 20, 1883. (No model.)

*To all whom it may concern:*

Be it known that I, JOHN H. PATTERSON, an officer in the United States Army, stationed and residing at Fort Supply, Indian Territory, have invented a new and useful Implement for Use as an Intrenching-Tool, of which the following is a specification.

The purpose of my invention is to provide a pick, hoe, and shovel combined, to be carried and used by soldiers on active service.

Figure 1:
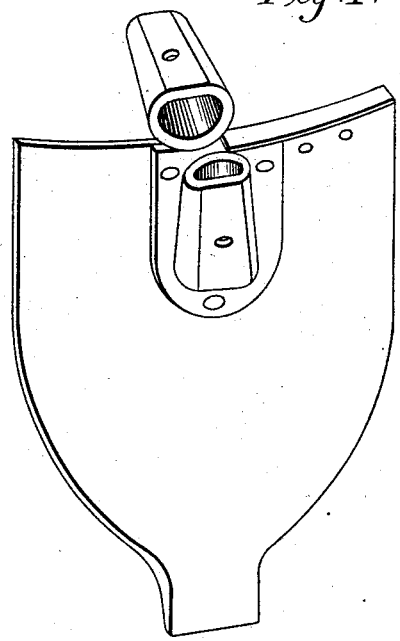
Figure 2:
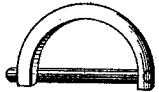
Figure 3:

Figure 1 shows a view of the intrenching-tool, presenting the arrangement of the eyes or sockets, blade, and pick-point; Figs. 2 and 3, the handle and eye-pin for securing the handle in the eye or socket of the intrenching-tool.

Referring to the drawings herewith, I describe my invention as follows: A steel blade tapering from one-half its length has at its extremity a pick or mattock point, the blade slightly dished. At the top of the blade, and at right angles to it, is placed an eye. Attached to the rear of the blade, and parallel to it, is placed an eye, the top of this eye a little below the top of the blade, both eyes flattened on top to prevent the handle (to be described) from turning when in use. Both eyes have a length of one and one-half inch. The blade is of steel—blade and point made in one piece. The rear of each eye at the largest end is one and one-half inch. The cross-measurement is one and one-quarter inch. The first measurement is horizontal. The upper half edge of blade, left side, is ground to cutting-edge, to be used in cutting brush or small wood. The eyes being first riveted to plates, the plates are then riveted to the blade, the same rivets passing through both plates. The eyes are of wrought-iron. The top edge of the blade has a piece of steel riveted to it on the right-hand side of the eye, to protect the sole of the soldier's shoe when pressing the blade into the ground with his foot. The large end of the top eye is to the rear, the large end of the other eye below. A wooden handle of hard wood, two feet long, shaped to fit the eyes, has a hole bored through it at the place where the handle emerges from the eye after it has been inserted. An iron key-pin, removable at the will of the soldier, passes through the hole, to keep the handle from working back through the eye when in use. To one end of this key-pin is riveted a half-circle of iron, the half-circle working freely, so that when the key-pin has been passed through the handle the half-circle can be passed partially around the handle, preventing the key-pin from working out.

To use the tool as a pick or hoe, insert the handle into the top eye from the rear until it binds, pass the key-pin through the hole, and turn the half-circle. In this form the tool can be used as a pick or hoe by men extended or prone upon the ground, to draw earth toward them for protection against musketry fire, obviating the necessity of rising even partially to accomplish the same purpose.

To use the tool as a shovel, insert the handle from below through the eye in rear, draw it through until it binds, and key as before described. In this form the tool can be used to throw up rifle-pits when not under fire, and in the absence of any immediate necessity for such protection.

The tool is carried on the march by suspending it from the soldier's belt by a strap over the right hip. The handle can be carried either strapped to the soldier's gun-stock or on his blanket-roll, as may be desired.

I claim—

1. In an intrenching-tool or similar implement, the combination of the blade, having two handle-sockets placed at approximately right angles with each other in the direction of the stroke of the tool, the one on the rear face, the other on the top or shoulder of the blade, and a suitable handle therefor, whereby the tool may be used either as a hoe, pick, or shovel, substantially as described.

2. In an intrenching-tool or similar implement, the combination of the blade, two shoulder-sockets thereon, located, the one on the face, the other at the top or shoulder of the blade, at approximately right angles to each other in the direction of the stroke of the tool, and each having a perforation in its side, a perforated handle, and a pin, whereby the handle and tool may be securely fastened together, substantially as described.

3. In combination with the blade of an intrenching or similar tool having a slit or flange secured to its upper edge, two handle-sockets set at approximately right angles to each other in the direction of the stroke of the tool, the one on the rear face, the other on the top or shoulder of the blade, the handle adapted for insertion in the sockets, and the locking-pin, substantially as described.

JNO. H. PATTERSON.

Witnesses:
  JNO. W. HEALEY,
  CHAS. C. DUNN.